United States Patent Office 2,942,988
Patented June 28, 1960

2,942,988
DOUGH COMPOSITION

Arthur B. Erekson, Scarsdale, N.Y., and Robert E. Duncan, Milltown, N.J., assignors to The Borden Company, a corporation of New Jersey No Drawing. Filed Feb. 26, 1958, Ser. No. 717,564

2 Claims. (Cl. 99—192)

This invention relates to a preleavened dough ready for baking in making biscuits, cinnamon or nut rolls, or the like.

The invention is particularly useful in the form of a canned refrigerated dough for biscuits and will be illustrated by description in connection with such use.

In such commercial refrigerated dough practice, there is ordinarily used, as the leavening agent or gas generating component, a slowly acting sodium pyrophosphate of the approximate formula $Na_2H_2P_2O_7$ in combination with sodium bicarbonate. All ingredients are mixed, the resulting dough rolled out, the dough then sheeted and cut into blanks such as discs about 1.5–2 inches in diameter by 1/4–1/2 inch thick. The cut-outs are dusted with rice flour or oiled to prevent sticking together. They are then stacked and packed in a suitable can. These cans are dough-tight but not gas-tight. As a result, air and carbon dioxide may and do escape so that the dough reaches and blocks the gas outlets. Within about 1.5–3 hours after the package is sealed, for instance, the biscuits will have so expanded as to fill the container and close the original vents for gas and the internal pressure of carbon dioxide generated by the leavening materials will have risen to around 8–16 p.s.i. Pressure within the can will be maintained over a period of 8 weeks or so if the biscuit dough and cans are normal and the storage temperature is between 40° and 50° F.

All of the equipment including containers herein referred to are conventional and are not illustrated.

The commercial importance of the product has induced competition in improving its quality. Efforts have been directed particularly to preserving the slow action of the leavener while increasing the lightness of the finished biscuits and eliminating the formation of phosphate crystals in the canned dough on standing, these crystals when they appear causing rejection of the product or uneven coloring of the baked goods. Solutions of these problems that are entirely satisfactory have not been realized heretofore.

Our process and composition provides a dough that is free from separation of phosphate crystals during the normal period of transportation and shelving of the dough. Our new composition also gave, in biscuits made over a 6-day period, 11%–17% more volume of the baked biscuits from a dough 8 weeks old than obtained in strictly comparable control tests with the same composition but with conventional sodium acid pyrophosphate and bicarbonate leavener.

Briefly stated, the invention comprises dough for biscuits or the like comprising flour, water, the usual minor ingredients, and leavener that includes the bicarbonate in combination with both the said pyrophosphate and also fumaric acid in proportion less than that of the pyrophosphate. The invention comprises also the process described herein for making the dough.

All components of the dough must be food grade materials.

For best results it is necessary that the pyrophosphate and the fumaric acid be in powder form, this term including fine granules, and neither so coarse as to give undesirably large bubbles of gas in the finished baked goods nor so fine as to react with the bicarbonate so rapidly that the gassing effect proceeds to an objectionable extent before the dough blanks can be canned, as during 10–30 minutes between mixing the dough and canning the cut-outs. It is necessary also that the pyrophosphate and the fumaric acid be used in proportions within certain ranges.

The sodium acid pyrophosphate is suitably of such particle size as to pass substantially completely through a U.S. standard 30-mesh screen and usually also through a 60 mesh and at least 50% through 200 mesh. The fumaric acid is of particle size to pass substantially completely through 30 mesh and to be retained to the extent of at least 70% on 100 mesh. With such gradation of particle sizes, we avoid objectionable amounts of oversized bubbles in the baked goods that would result from objectionably large particles of the acid and also avoid the premature release of an undesirable proportion of the total gas possible, by overly fine and quickly soluble particles.

The sodium acid pyrophosphate is supplied to advantage in the form of the essentially anhydrous material.

The flour used is a standard flour for biscuit dough, as for instance wheat flour containing about 10.5%–12.5% protein. We use ordinarily a mixture of hard wheat and soft wheat flour of protein content 11%–12%.

The shortening is any one usual for like purposes. Examples are lard, chicken fat, hydrogenated soya bean, cottonseed, corn or other vegetable oil, or a mixture of one or more of these hydrogenated oils with an animal fat, in any proportion to give a shortening of the usual characteristics and taste for biscuits.

Milk proteins are ordinarily incorporated. Satisfactory materials are spray-dried skim milk. Whole milk protein in dried form may be used but is unnecessary. Lactalbumin and food grade casein may be introduced for nutritional purposes.

Seasoning agents used are conventional, as for instance cane, beet or corn sugar, salt, and the like.

Water is used in amount to make the dough handleable, that is, of such consistency that the dough may be processed mechanically and the cut-out blanks handled by hand into the cans without being either so soft (wet) as to be sticky or so stiff as not to sheet out well or to consolidate normally when subjected to the rolling operation before cutting out of the blanks. Suitable amounts of water are 50–70 and usually 58–64 parts for 100 of the flour, the exact proportion within these ranges varying with the particular grade of flour selected for use.

The sodium acid pyrophosphate is used in the proportion of 1.4–2 parts for 100 of the flour, the fumaric acid 0.35–0.65 part, and these two acidic components together in total amount to correspond, in acid equivalency, to approximately 2.25–3.25 parts and for best results about 2.35–2.6 parts of the pyrophosphate.

The sodium bicarbonate is used in amount approximately equivalent to the acidic components and normally in proportions not more than 20% in excess of that required to neutralize the said components.

The invention will be further illustrated by the following specific examples of the practice of it.

In these examples and elsewhere herein, proportions are expressed as parts by weight on the dry basis except that the flour is stated on the basis of a moisture content of 14%.

*Example 1*

The composition is made of the following formula:

| Ingredient | Parts by Weight |
|---|---|
| Flour | 100 |
| Shortening | 12.5 |
| Non-fat dry milk | 4 |
| Sugar | 4 |
| Salt | 2.5 |
| Water | 62 |
| Sodium acid pyrophosphate (SAPP-28) | 1.9 |
| Sodium bicarbonate | 2.1 |
| Fumaric acid | .4 |

The flour used had a protein content of about 11.5% on the dry basis and moisture 14%.

The sodium acid pyrophosphate used had an equivalent weight as an acid of 111. That is, 222 parts were required to correspond to 1 mole (116 parts) of the fumaric acid.

The particle sizes of the acidic materials as introduced into the mix were as shown in the following table of screen tests.

| Screen, Meshes per Linear Inch | Acid Component, Cumulative, Percent ||
|---|---|---|
|  | Pyrophosphate | Fumaric Acid |
| On 40 | 0 | 0 |
| On 50 |  | 12 |
| On 60 | trace | 26 |
| On 70 |  | 53 |
| On 100 | 0.2 | 86 |
| Through 100 |  | 14 |
| On 200 | 6 |  |
| Through 200 | 93.8 |  |

The flour is placed in a conventional bread dough mixer and the mixed leavening ingredients are added to it, followed by 1 minute of mixing at slow speed of agitation. Then the shortening is added to this mixture and agitation is continued for another 2 minutes.

A separate premix is made of the water with the non-fat dry milk (Starlac), sugar (sucrose) and salt.

This premix is added into the dough mixer while the mixer is operated under slow speed. Such mixing is continued for approximately 1 minute followed by 4 minutes of mixing at high speed.

The resulting dough is then transferred to troughs and delivered to the sheeting line. There the dough is divided into pieces of approximately 35 to 40 pounds in weight and each piece is passed through a conventional dough break, consisting of a set of three rollers between which the dough is worked and flattened.

The rolled pieces are then placed on a series of sheeters which forms them into a continuous sheet of dough approximately ½ inch thick by 18 inches wide. This sheet is passed through a rotary cutter which cuts it into hexagonally shaped biscuit blanks approximately 1¾ inches wide.

The biscuits are then packed into cans in numbers to make the cans about 80%–90% full. The cans are then immediately closed. The closing of the cans is not gas-tight. During the following 2–3 hours of proofing (expansion on holding at room temperature such as 60°–75° F.), the expansion of the biscuit causes the air to be driven from the can through gas escape outlets or openings which may be around the seamed ends or, in the case of some cans, through the side. When the biscuits have expanded sufficiently to fill the cans, the expanded dough seals the gas vents so that further substantial escape of gas is prevented.

At the end of the proofing period, the canned biscuits are placed in a cooler at approximately 40° F. and held there until the dough has been chilled to that temperature. They are then ready for shipment to the trade, the cans being held under refrigeration at 35°–50° F. or lower at all times. Finally the units are removed from the can and baked in customary manner.

No crystals of the phosphate or other material separate at any time from the dough during the processing or in an 8 weeks' refrigerated storage test at 40°–50° F. Furthermore, the biscuits after baking are free of discolored spots formerly associated with the concentration of the separated phosphate crystals. These spots previously obtained were yellowish if inside the biscuit and white if on the outside browned surface.

We find an increase in the volume of the baked biscuits packed from 1 pound wet weight of the biscuit dough after 8 weeks' refrigeration. Thus biscuits made in control tests on each of six different days from a pound of the wet dough, with a commercial leavener providing somewhat more than 2.5% of the sodium acid pyrophosphate on the weight of the flour, had the volumes tabulated below for comparison with the large volumes obtained with our new leavener combination:

| Day of Test | Total Volume ml. of Biscuits from 1 lb. Wet Dough ||
|---|---|---|
|  | Pyrophosphate Leavener | Increase with Pyrophosphate and Fumaric Acid Leavener |
| 1 | 1,304 | 148 |
| 2 | 1,299 | 154 |
| 3 | 1,333 | 232 |
| 4 | 1,252 | 183 |
| 5 | 1,277 | 180 |
| 6 | 1,222 | 182 |

Once these advantages have been observed, various theories may be advanced to explain the mechanism by which the advantages are obtained. We consider that the fumaric acid in combination with the acid pyrophosphate (1) decreases the proportion of difficulty soluble $Na_2HPO_4$, or other phosphate under refrigeration that would otherwise form, and (2) causes generation of the gas at the rising of the biscuits as desired.

*Example 2*

The procedure and composition of Example 1 is used except that the amount of sodium bicarbonate used is 1.9.

It is to be understood that it is intended to cover all changes and modifications of the examples of the invention herein chosen for the purpose of illustration which do not constitute departures from the spirit and scope of the invention.

We claim:

1. In a dough mix for refrigerated storage and subsequent baking including flour, shortening, sodium bicarbonate of baking soda grade, acidic material for reaction with the bicarbonate, water in amount to make the dough handleable, and seasoning material, the improvement comprising the acidic component essentially in the form of a combination of disodium acid pyrophosphate and fumaric acid, the proportions for 100 parts by weight of the flour being approximately 1.4–2 parts of the pyrophosphate on the anhydrous basis and 0.35–0.65 of the fumaric acid and the total of the acidic materials being equivalent as acid to approximately 2.25–3.25 parts of the pyrophosphate.

2. The dough of claim 1 in which the sodium bicarbonate is in amount at least approximately equivalent to the total acidity of the said pyrophosphate and fumaric acid and not in excess thereof by more than 20% and the amount of water is within the range 50–70 parts by weight for 100 parts of the flour.

References Cited in the file of this patent

UNITED STATES PATENTS 2,478,618    Armstrong _____ Aug. 9, 1949

FOREIGN PATENTS 477,911    Canada _____ Oct. 16, 1951